May 20, 1947.  C. NELSON, JR  2,420,836
TRACTOR-MOUNTED LOG-HOLDING POWER-OPERATED SAW
Filed Jan. 24, 1945  2 Sheets-Sheet 1

Inventor
Charles Nelson, Jr.

Attorneys

May 20, 1947.  C. NELSON, JR  2,420,836
TRACTOR-MOUNTED LOG-HOLDING POWER-OPERATED SAW
Filed Jan. 24, 1945  2 Sheets-Sheet 2
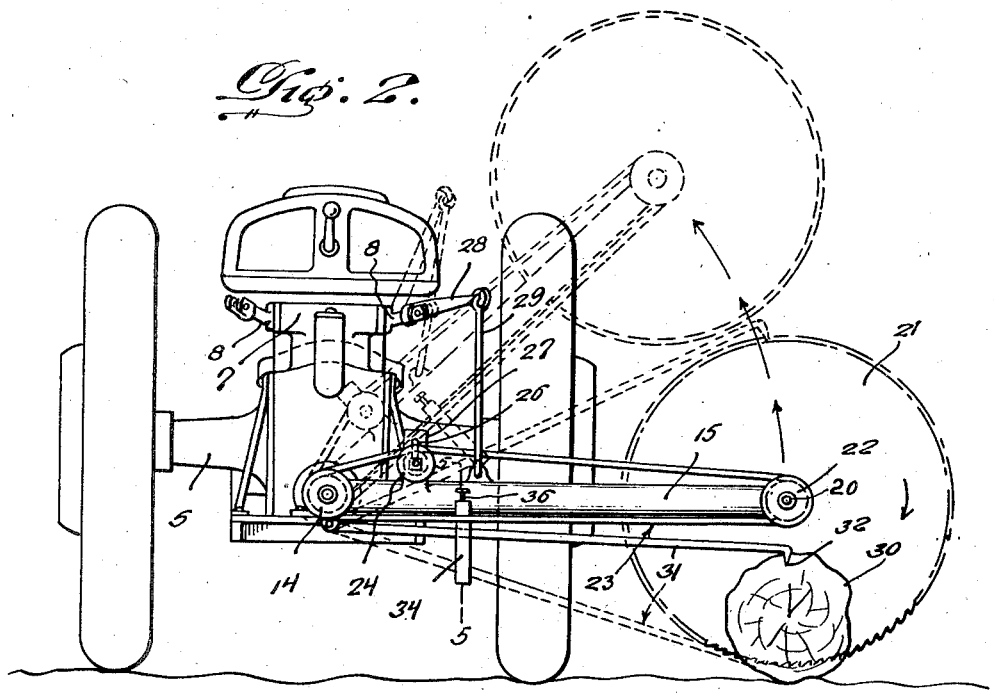
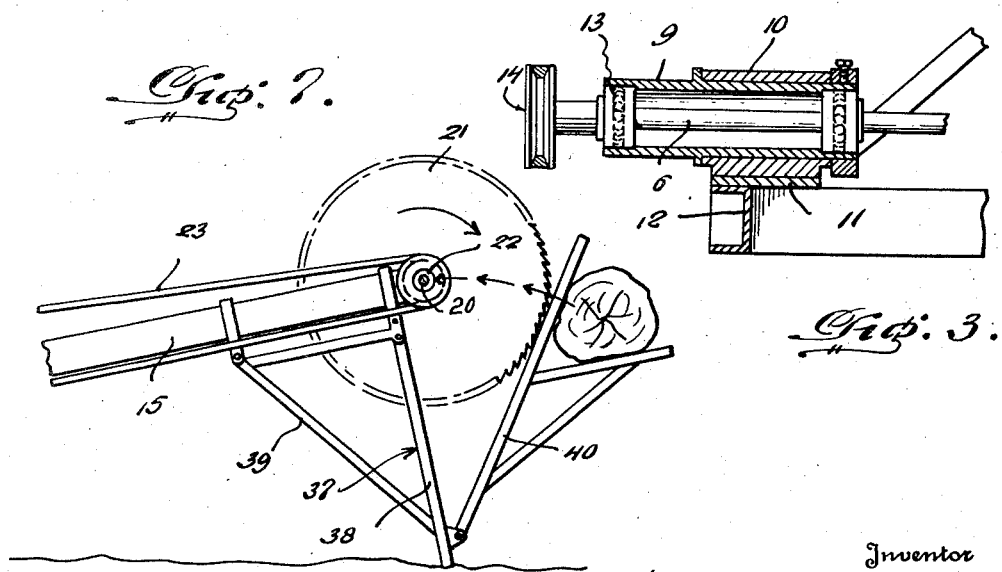
Inventor
Charles Nelson, Jr.,
Attorneys Patented May 20, 1947

2,420,836

UNITED STATES PATENT OFFICE 2,420,836

TRACTOR-MOUNTED LOG-HOLDING POWER-OPERATED SAW

Charles Nelson, Jr., Lucas, Kans.

Application January 24, 1945, Serial No. 574,225

1 Claim. (Cl. 143—43)

The present invention relates to new and useful improvements in power operated saw embodying means for operatively connecting a circular saw with the power take-off of a conventional form of tractor of a type provided with a hydraulic or mechanical lift mechanism and providing a pivoted arm for the saw connected with the lift mechanism for utilizing the latter in raising and lowering the saw, when desired.

An important object of the present invention is to provide a power driven saw of this character in which the saw is operatively mounted at the outer end of a pivoted arm extending laterally at one side of the rear end of the tractor and by means of which the saw may be moved into successive cutting positions with respect to the log lying at one side of the tractor by driving the tractor either forwardly or rearwardly at the side of the log.

A further object of the invention is to provide anchoring means for the log carried by the saw arm and by means of which the log is secured against accidental movement during the sawing operation.

A still further object of the invention is to provide a power driven saw of this character adapted for operatively connecting to a conventional form of tractor without necessitating any material changes or alterations therein.

Another object is to provide an apparatus of this character of simple and practical construction, which is efficient and reliable in operation, relatively inexpensive to manufacture and install in operative position on the tractor and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 2 is a rear end elevational view.

Figure 3 is an enlarged plan view of the bearing at the outer end of the saw supporting arm and with parts shown in section.

Figure 7 is a fragmentary end elevational view of the log support in association with the saw supporting arm.

Figure 1:
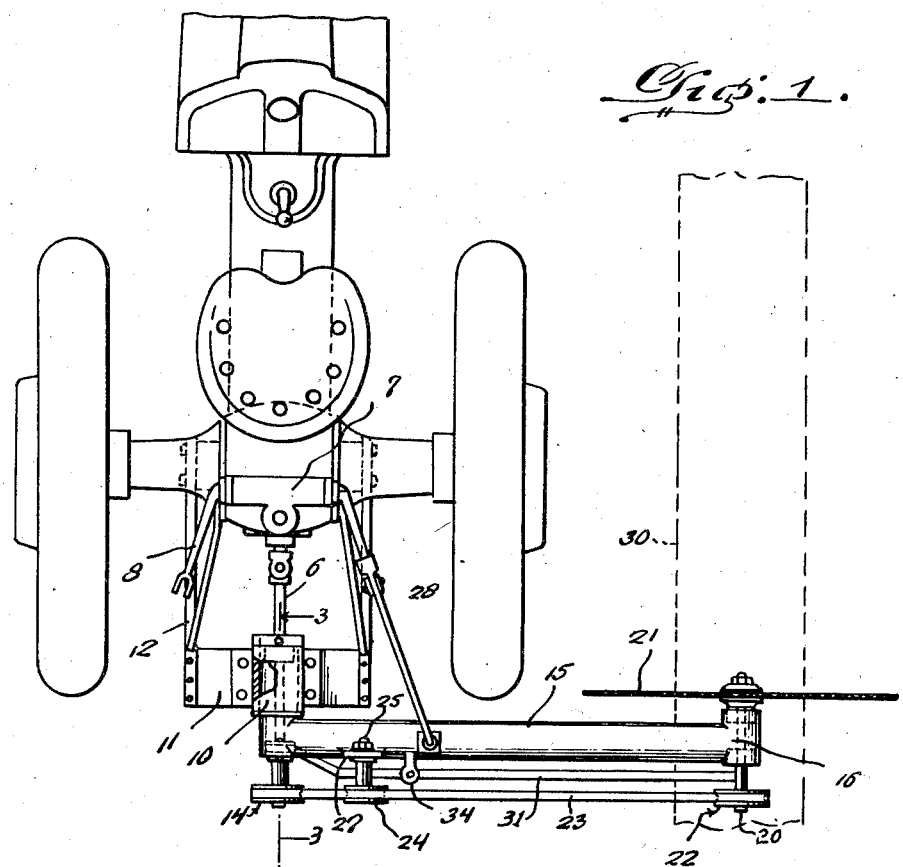
Figure 1 is a top plan view.

Referring now to the drawings in detail wherein for the purpose of illustration I have disclosed a preferred embodiment of the invention, the numeral 5 designates a conventional form of tractor which includes a power take-off shaft 6 and a hydraulic or other type of lift mechanism designated generally at 7, the lift mechanism including a pair of rearwardly extending lift arms at the opposite sides of the tractor.

The rear end of the shaft 6 is journaled in a bearing housing 9 secured by means of a clamping plate 10 to the rearwardly projecting platform 11 supported on the rear end of the tractor frame 12. The shaft 6 is journaled in bearing assemblies 13 mounted in the housing 9 and to the rear end of the shaft is attached a pulley 14.

The housing 9 is of tubular construction and is pivoted in the plate 10, the housing projecting rearwardly of the plate.

To one side of the rear end of the housing is formed a tubular arm 15 and adapted for extending laterally at either side of the tractor.

To the outer end of the arm 15 is formed a transversely disposed tubular housing 16 having shaft 20 journaled therein.

To one end of the shaft 20 is secured a circular saw 21 and to the other end of the shaft 20 is secured a pulley 22. The pulley 22 is driven from the pulley 14 by means of a belt 23. A belt tightening pulley 24 is journaled on a pin 25 for engaging the upper flight of the belt, the pin being adjustably secured in a vertically extending slot 26 formed in a bracket 27 rising from the arm 15.

Figure 4:
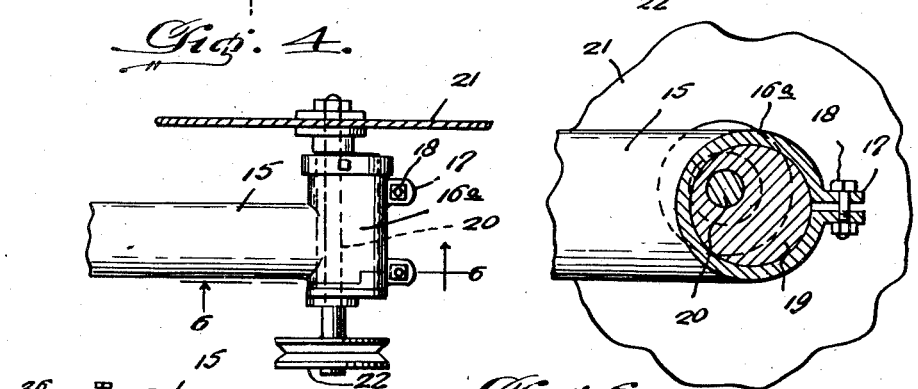
Figure 4 is a fragmentary plan vew of a modified belt tightener.
Figure 6:
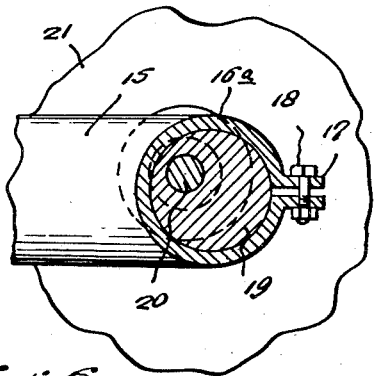
Figure 6 is a sectional view taken substantially on a line 6—6 of Figure 4.
Figure 5:
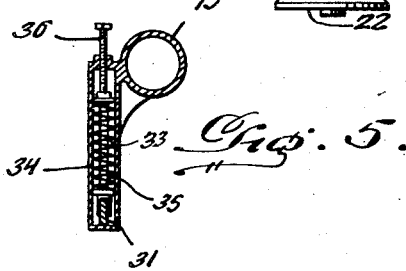
Figure 5 is a sectional view through the spring housing for the log anchoring bar and taken substantially on a line 5—5 of Figure 2.

In the form of the invention shown in Figures 4 and 6 a modified belt tightener is indicated and which comprises a longitudinally split housing 16a on the end of the arm 15 and on the split edges of which are apertured ears 17 connected together by bolts 18 to draw the split edges together. A cylindrical bearing 19 is secured in the housing 16a and in which the shaft 20 is eccentrically journaled. The belt is tightened by adjusting the bearing 19 in the housing.

A lift arm extension 28 is secured at one end to one of the lift arms 8 and to the outer end of the lift arm extension is pivotally attached a link 29 extending downwardly from the extension and attached to an intermediate portion of the arm 15.

Accordingly, in the operation of the device the saw 21 is driven from the power take-off shaft 6 through the pulleys 14 and 22 and the belt 23 and the saw may be raised and lowered into and out of cutting position with respect to a log 30 through the operation of the lift mechanism 7.

By driving the tractor 5 alongside of the log 30 and lowering the saw supporting arm 15 the log may be cut in a desired length and the saw moved longitudinally along the log for successively cutting the same by moving the tractor forwardly or rearwardly at the side of the log.

A log anchoring arm 31 is pivoted at one end to the underside of the arm 15 adjacent its inner end, the outer end of the arm 31 being formed with a downwardly extending prong 32 for embedding in the log.

The intermediate portion of the arm 31 is slidable vertically in a slot 33 formed in a tubular guide 34 attached to one side of the arm 15. The anchoring arm 31 is yieldably urged downwardly by means of a coil spring 35 positioned in the guide 34, the tension of the spring being adjusted by a screw 36 threaded through the top of the guide.

The log anchoring arm 31 is raised and lowered together with the raising and lowering movement of the arm 15 and the spring 35 exerts its influence on the arm 31 to maintain the prong in the log.

If desired a support 37 may be provided for the log and comprises a leg 38 attached to the outer end of the arm 15 and including braces 39 thereon, together with a table 40 pivoted to the leg and on which the log is supported, the table being manually movable toward the leg to cause the log to move against the saw.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though I have herein shown and described a preferred embodiment of my invention that the same is susceptible to certain changes fully comprehended by the spirit of the invention as herein described and the scope of the appended claim.

Having thus described the invention, what I claim is:

A tractor operated saw of a type in which the tractor includes a power take-off shaft and a power operated lift mechanism, an arm pivoted on the tractor at the rear end of the shaft and in a plane transverse of the tractor, a saw journaled at the outer end of the arm, means operatively connecting the saw to the shaft, means connecting the arm to the lift mechanism to raise and lower the saw into and out of engagement with a log at one side of the tractor, a log anchoring bar pivoted at one end to said arm, a prong at the outer end of the bar adapted to penetrate into a log for securing the log against movement, a guide carried by the arm having a vertical slot extending parallel to said plane freely receiving the bar, and spring means in the slot and engaging the bar to urge the prong downwardly into the log.

CHARLES NELSON, Jr.

REFERENCES CITED

The following references are of record in the file of this patent:

UNITED STATES PATENTS

| Number | Name | Date |
| --- | --- | --- |
| 1,323,490 | Putnam | Dec. 2, 1919 |
| 2,350,880 | Dellinger et al. | June 6, 1944 |
| 1,126,312 | Strauss | Jan. 26, 1915 |
| 1,798,402 | Dibble | Mar. 31, 1931 |
| 2,310,152 | Ronning | Feb. 2, 1943 |
| 2,312,287 | Renner | Feb. 23, 1943 |
| 2,330,996 | Rivers | Oct. 5, 1943 |

FOREIGN PATENTS

| Number | Country | Date |
| --- | --- | --- |
| 112,255 | Australia | Dec. 30, 1940 |